Nov. 6, 1934.　　P. F. SCOFIELD　　1,979,352
CATHODE CONTROL
Filed Oct. 4, 1932　　2 Sheets-Sheet 1

INVENTOR,
PHILIP F. SCOFIELD.
BY
ATTORNEY

Nov. 6, 1934.                P. F. SCOFIELD                1,979,352
                             CATHODE CONTROL
                       Filed Oct. 4, 1932    2 Sheets-Sheet 2
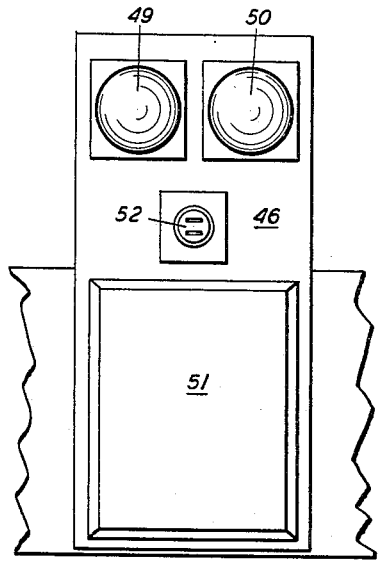
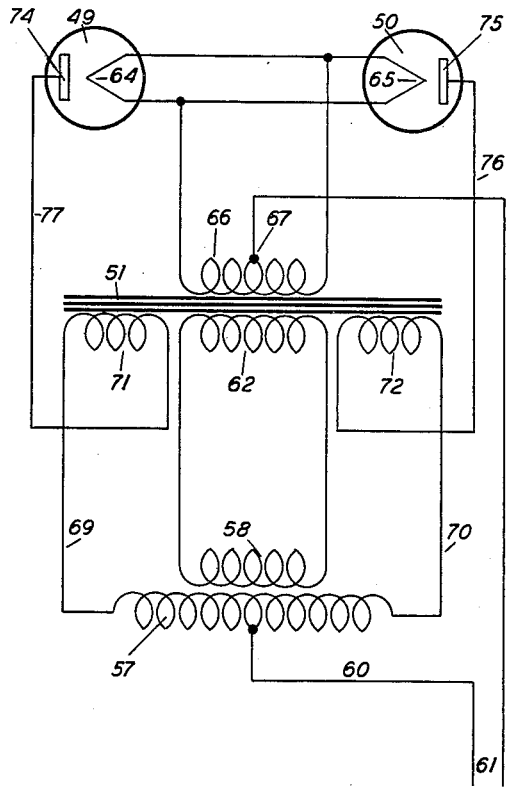
INVENTOR,
PHILIP F. SCOFIELD.
BY
ATTORNEY Patented Nov. 6, 1934

1,979,352

UNITED STATES PATENT OFFICE 1,979,352

CATHODE CONTROL

Philip F. Scofield, Palo Alto, Calif., assignor to Heintz & Kaufman, Ltd., San Francisco, Calif., a corporation of Nevada Application October 4, 1932, Serial No. 636,119½

8 Claims. (Cl. 171—119)

My invention relates to a thermionic tube cathode control and more particularly to a thermionic tube control and work circuit energized by a portable internal combustion engine driven alternator.

Among the objects of my invention are: to provide a compact portable power unit; to provide cathode current regulation for a thermionic tube operated by a portable engine-driven alternator, or other variable output power source; to provide a source of direct current for use on exploratory expeditions, in aircraft, or other places distant from commercial mains; to provide means for controlling the cathode current supplied to a hot cathode thermionic tube in accordance with the load demanded, or used; and to provide a portable D. C. current source which cannot be harmed by overloads.

Other objects of my invention will be apparent or will be specifically pointed out in the description forming a part of this specification, but I do not limit myself to the embodiment of my invention herein described, as various forms may be adopted within the scope of the claims.

In the drawings forming a part of these specifications and attached thereto,

Figure 3 is a plan view of the rectifier panel.

Figure 4 is a schematic wiring diagram of a thermionic rectifier circuit to be used in conjunction with the alternator.

The problems involved in the design of a truly portable direct current source are many, as the factors of weight, reliability and current regulation are of paramount importance, since the source will often be heavily overloaded even to the point of short circuit.

Broadly speaking, I have found a satisfactory solution to these problems by the use of an alternator driven by an internal combustion engine, the generated alternating current being rectified by a hot cathode thermionic rectifier tube. I have also found that in a thermionic tube having a cathode adapted to be electrically heated, and an anode, I am able to control the cathode current by partially supplying it through a transformer from a source, the transformer having auxiliary windings thereon in series with the anode which induce additional currents which are also supplied to the cathode. I am therefore able either to maintain the cathode current constant when the anode load increases, or to increase the cathode current as the anode load increases. I prefer to speak of cathode control as applying to both or either of the above conditions.

Figure 1:
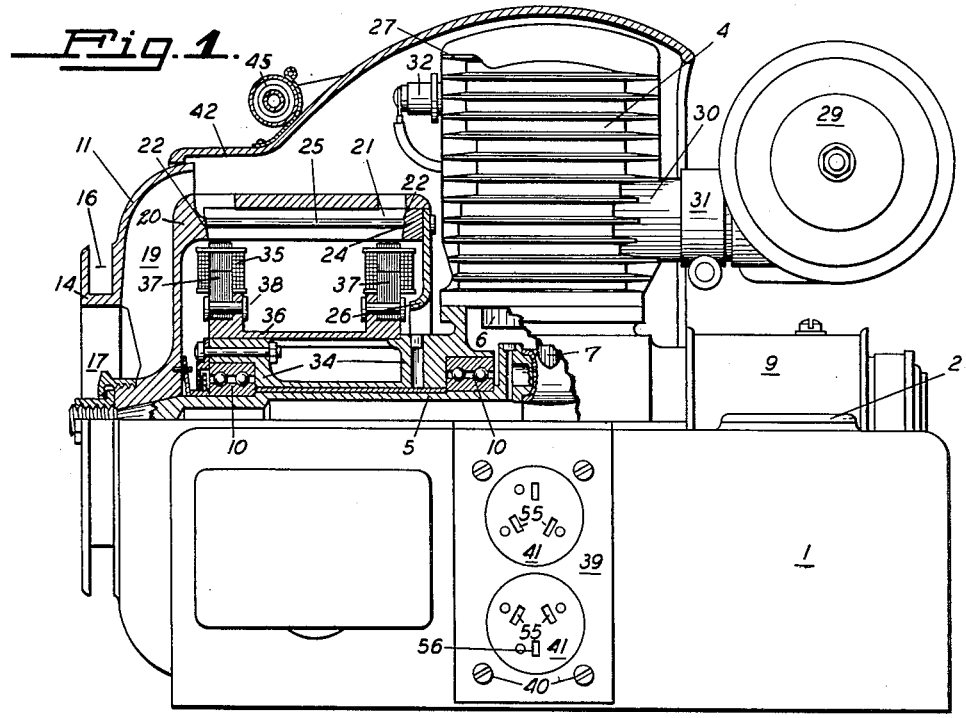
Figure 1 is a side view, partly in section, and partly in elevation of a portable engine-driven alternator.

Referring directly to the drawings, illustrating a preferred embodiment of my invention as applied to an engine-driven alternator-rectifier combination, with special reference to Figure 1, a unitary base casting 1, is preferably hollow to form a fuel tank adapted to be filled through an opening shown covered by a cap 2. This base forms a foundation upon which is mounted an internal combustion engine comprising a cylinder 4, crank shaft 5, piston 6 and connecting-rod 7. One end of the shaft is extended to operate an ignition magneto 9, while the other end is extended through ball bearings 10—10 to a flywheel 11.

This flywheel is hollow and formed with integral fan blades 12, and a starting rim 14 provided with notches 15 for attachment of a starting rope, to be wound in the pulley space 16. The fan blades are so arranged as to draw air through openings 17 between the blades, and discharge that air through the interior space 19 of the flywheel, the air emerging near the inner periphery.

Formed integral with the flywheel is a field frame 20, extended back over the shaft. This frame supports a plurality of bar magnets 21 held securely in place by being provided with tapers 22 at each end, locked through pressure on an end ring 24 applied by bolts 25. A dust cover 26 protects the open end of the frame.

I prefer to form the entire flywheel and frame of aluminum or its alloys, and rely entirely on the weight of the bar magnets to give a flywheel effect. I also prefer to use chrome magnets giving high field densities, grinding them to strict size limits.

The cylinder 4 is cast with integral cooling fins 27 set parallel to the line of air flow. A muffler 29 is attached to the rear port pipe 30 centrally emerging from the rear of the cylinder, by a clamp 31. A spark plug 32 is centrally located in the front of the cylinder.

An extension sleeve 34 extends forward from the cylinder, holds the bearings 10—10 in place, and forms the foundation for two rings of armature coils 35, mounted on a double armature frame 36, by means of circular core laminations 37 extending around the frame, and held to it by rivets 38. The coils are secured to projections from these laminations.

The armature frame, with two sets of assembled coils, is positioned so that one set of coils is directly adjacent each end of the bar magnets, with a small air-gap.

The armature coils may then be electrically connected in any desired manner, and leads (not shown) brought out to a receptacle panel 39 held to the side of the base 1 by screws 40. This panel is provided with receptacles 41 for the attachment of pronged plugs, through which alternating current may be drawn.

An airtight cover 42 for direction of draft on the cylinder is fastened to the base 1 by lateral snaps 44 and is provided with a handle 45 by which the engine may be transported. This cover receives the air from the flywheel periphery, conducts it past the cylinder and empties it on the muffler, which is also finned for cooling, although these fins do not show in the drawings.

The mechanism as described is, therefore, a direct coupled, engine driven alternator, designed to operate on the two-cycle principle.

In the specific embodiment shown I prefer to use 12 magnets, and two sets of coils of 12 each. I prefer, for purposes to be later described, to connect twenty coils in series with one receptacle 41, and to connect four in series with the remaining receptacle. At an engine speed of 4,000 R. P. M. the output is 300 watts, and the generator is practically self-regulating, inasmuch as it will stand direct short-circuit indefinitely without harm, and without greatly reducing the speed of the engine.

The engine completely loaded with fuel, in which the lubricating oil is dissolved, weighs only thirty-one pounds.

As the 300 watts of output is in the form of alternating current at 400 cycles per second, it is obviously not suited for use in D. C. work circuits. I therefore have provided a rectifier panel 46 which, on one side carries prong plugs 47 exactly fitting the receptacles on the engine.

Figure 2:
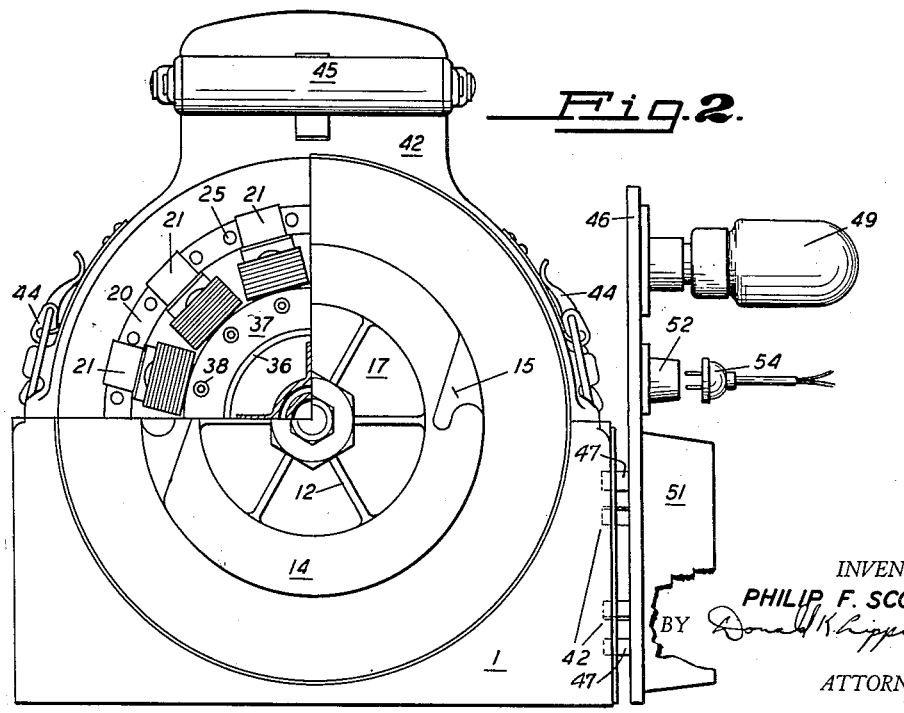
Figure 2 is an end view of the same partly in section and partly in elevation.

This panel carries two rectifier bulbs 49 and 50 of the hot cathode type, a cathode control transformer 51 and a work circuit receptacle 52. I have indicated the attachment of a work circuit by a work circuit plug 54 in Figure 2.

In the receptacles 41 shown in Figure 1, I have indicated two live prong sockets 55 in each one, and I prefer to utilize the remaining prong socket 56 of the lower receptacle for a center tap of the twenty-coil series, leaving the remaining prong socket in the upper receptacle blank.

Referring directly to Figure 4, one form of my control circuit as adapted to the generator described, is shown diagrammatically and reduced to its lowest terms. I have indicated the twenty-coil series as a long inductance 57 and the four-coil series as a short inductance 58. I bring the center tap 60 directly out as one leg of the D. C. work circuit 61.

The output of the four coils goes directly to a primary 62 of the transformer 51. The cathodes 64 and 65 of the two rectifiers are connected in parallel and to a secondary winding 66 of the transformer. A center tap 67 on this secondary winding forms the other leg of the D. C. work circuit 61.

Leads 69 and 70 from the twenty-coil series pass through auxiliary windings 71 and 72 mounted as additional primaries in aiding relation to the secondary windings 66 and then go to anodes 74 and 75 of the rectifier tubes through leads 76 and 77. This provides rectifier excitation, and the complete circuit constitutes a full-wave rectifier, supplying unfiltered D. C. to the work circuit 61. The pulsations, however, are of such relatively high frequency that motors, electric drills, searchlights, etc., designed for D. C. operation will operate perfectly, the inductance of the coils serving as filters where filtering is necessary.

The action of the auxiliary windings is as follows: With no current being passed through the rectifiers, I prefer to design or adjust the transformer so that the cathodes are heated to the proper temperature for normal load operation. Then as additional load is demanded by the work circuit, and the output voltage is reduced, with consequent reduction of cathode current, the current through the auxiliary windings induces additional current in the secondary, where it is available for the filaments.

It is therefore possible to either maintain the cathode current constant irrespective of load, or when certain types of rectifier tubes are used, to have the filament current increase, in proportion to the load. Both of these conditions are desirable when operating hot cathode devices from a limited source supplying both cathode heating current and anode excitation.

The combination as described makes direct current available in remote geographical locations, and in aircraft. As no commutator is used sparking is eliminated, and the regulating propensities of alternating current may be utilized in the highest degree.

While I have described my invention as applied to rectifiers operating from a gas engine generator, I have found that it may be employed in conjunction with any thermionic tube having an anode and cathode adapted to be heated electrically wherein it is desirable to either maintain the filament current constant, or to vary it in accordance with the load on the tube. A modulator tube in a radio telephone transmitter is an example of another type of tube to which my invention may be applied.

I claim:

1. In combination, a generator of alternating current, said generator having a plurality of coils, a rectifier energized by a portion of said coils, a hot cathode for said rectifier energized by the remainder of said coils, a work circuit connected to said rectifier, and means for causing the current in said work circuit to react upon said hot cathode.

2. In combination, a generator having a plurality of coils separated into a rectifier portion and a cathode portion, a rectifier connected to said rectifier portion, a work circuit for said rectifier, a cathode adapted to be heated included in said rectifier, a transformer having a primary, a secondary and an auxiliary winding, said primary being connected to said cathode portion, said secondary being connected to said cathode, and said auxiliary portion being included in said work circuit.

3. In combination, an alternating current generator having a plurality of coils separated electrically into a rectifier portion and a cathode portion, tube rectifiers connected in full-wave relationship to said rectifier portion, a work circuit including said rectifiers, cathodes adapted to be heated included in said rectifiers, a transformer having a primary, a secondary, and auxiliary windings, said primary being connected to said cathode portion, said secondary being connected to said cathodes, and said auxiliary windings being included in said work circuit.

4. In combination, a thermionic tube having an anode and a cathode adapted to be electrically heated, a generator of alternating current connected to said anode, a second generator of alternating current connected to said cathode, said generators being driven by common motive power, and means to cause the current used by said anode to react upon the current used by said cathode.

5. In combination, a thermionic tube having an anode and a cathode adapted to be electrically heated, a generator of alternating current connected to said anode, a second generator of alternating current connected to said cathode, said generators being driven by common motive power, and means to cause the current used by said anode to induce additional current in said cathode source.

6. In combination, a thermionic tube having an anode and a cathode adapted to be electrically heated, a generator of alternating current connected to said anode, a second generator of alternating current connected to said cathode, said generators being driven by common motive power, and means for controlling the amount of current used by said cathode in accordance with the amount used by said anode.

7. In combination, a thermionic tube having an anode and a cathode adapted to be electrically heated, a generator of alternating current for said anode, a second generator of alternating current for said cathode, said generators being driven by common motive power, a transformer having a primary, a secondary and an auxiliary winding, means for connecting the primary to said cathode source, means for connecting the secondary to said cathode, and means for connecting said anode to said anode source through said auxiliary winding.

8. In combination, a generator of alternating current, a transformer fed by said generator and having a plurality of windings, rectifying means connected to one of said windings, a second generator of alternating current, said generators being driven by common motive power, a divided work circuit connected to said rectifying means through other of said windings and to said second source to produce a reaction on the output of said transformer.

PHILIP F. SCOFIELD.